United States Patent [19]
Matsui
[11] Patent Number: 4,991,100
[45] Date of Patent: Feb. 5, 1991

[54] METHOD FOR COMPUTING A VALUE OF SPEED FROM A PULSE SIGNAL

[75] Inventor: Mitsuru Matsui, Gumma, Japan

[73] Assignee: Mitsuba Electric Manufacturing Co., Ltd., Gumma, Japan

[21] Appl. No.: 260,977

[22] Filed: Oct. 21, 1988

[30] Foreign Application Priority Data

Oct. 21, 1987 [JP] Japan ................................ 62-265888

[51] Int. Cl.[5] ................................ G01P 3/04

[52] U.S. Cl. ................................ 364/426.04; 364/565; 324/161

[58] Field of Search ................................ 364/426.04, 424.01, 364/565, 566; 180/170, 176; 324/160, 161; 123/361, 362

[56] References Cited

U.S. PATENT DOCUMENTS 4,451,890 5/1984 Suzuki et al. .................... 364/426.04
4,598,370 7/1986 Nakajima et al. .............. 364/426.04
4,722,411 2/1988 Ohashi et al. ...................... 180/197
4,767,428 8/1984 Caldwell ......................... 364/426.04
4,777,611 10/1988 Tashiro et al. ....................... 364/565
4,799,178 1/1989 Spadafora et al. .................. 364/565

FOREIGN PATENT DOCUMENTS 59-210370 4/1984 Japan .

*Primary Examiner*—Thomas G. Black
*Attorney, Agent, or Firm*—Skjerven, Morrill, MacPherson, Franklin & Friel

[57] ABSTRACT

A method for computing a current vehicle speed value from a detected vehicle speed value derived from a pulse signal, said method provided data which can be used in a control process such as a cruise control of a vehicle, in which the current vehicle speed value is predicted from a previously computed vehicle speed value after an abnormal state of the current detected vehicle speed value is detected; and a cancel signal is produced for aborting the control process when the abnormal state has persisted for more than a certain time period. Thus, the derivation of an abnormal computed vehicle speed value is prevented when a temporary abnormal condition of the detected vehicle speed value has occurred, and a cancel signal, which may be used for aborting the operation of the control process, is produced when the abnormal condition of the detected vehicle speed has persisted for more than a certain time period, whereby the control system can respond to the abnormal conditions of the detected vehicle speed value in optimal fashion, and convenience and safety are both maximized.

8 Claims, 2 Drawing Sheets

START
ST1
$V_n = \frac{V + V_{n-1}}{2}$
ST2
$M2(a_{n-2}) \leftarrow M1$
$M1(a_{n-1}) \leftarrow M$
ST3
$\Delta V = V - V_{n-1}$
$a_n = (V_n - V_{n-1})/t$
$M \leftarrow a_n$
ST4
$|\Delta V| \geq Vr$ ?
NO
YES
ST8
$F \leftarrow 0$
ST5
$F = 1$ ?
YES
ST9
CANCEL
NO
ST6
$F \leftarrow 1$
ST7
$Vp = V_{n-1} + \frac{(a_{n-1} + a_{n-2})t}{2}$
$V_n \leftarrow Vp$
$a_n = (V_n - V_{n-1})/t$
$M \leftarrow a_n$
RETURN vehicle speed
detected vehicle speed V
computed vehicle speed $V_n$
$T_{n-2}$ $T_{n-1}$ $T_n$ $T_{n+1}$
time

METHOD FOR COMPUTING A VALUE OF SPEED FROM A PULSE SIGNAL

TECHNICAL FIELD

The present invention relates to a method for computing a value of speed from a pulse signal, and in particular to such a method which filters out grossly erroneous data but would not leave permanent errors which may be due to a system failure undetected.

BACKGROUND OF THE INVENTION

In a cruise control system based on a digital circuit for controlling the vehicle speed at a fixed level, it is necessary to monitor the current vehicle speed at each control cycle. Typically, the vehicle speed is computed by counting the number of pulses generated from a pulse generator provided adjacent to a rotating part of a wheel assembly over a certain time interval defined by the internal clock of a CPU for each control cycle executed in the CPU. An example of cruise control system is disclosed in U.S. patent application No. 129,257 filed Dec. 7, 1987. The contents of this application is herein incorporated by reference. One of the assignees of this application is common to the assignee of the present application.

In such a speed detecting system, the detected number of pulses may be either underrated or exaggerated due to the inadvertent omission of pulses and contamination of the pulses with noises. In either case, the operation of the cruise control system is based on erroneous speed data. Generation of erroneous data can be detected as an abrupt change in the computed speed. Since erroneous speed data leads to an erratic action of the cruise control system, some measure must be taken in order to prevent any undesirable consequence from the use of erroneous speed data.

It is possible to abort the operation of the cruise control system when any such error in the speed data is detected, but too frequent abortion of the cruise control system causes undue inconvenience to the user of the cruise control system. To eliminate this problem, Japanese patent laid open publication No. 59-210370 proposes to not use incoming data after an abrupt change in the current data is detected until the incoming data following the abrupt change has maintained the same level for more than a certain number of control cycles.

However, according to this proposal, since abnormal data is accepted when it has persisted long enough, the occurrence of the abnormal data, which may be, for instance, due to a failure in the pulse generator, tends to be disregarded, and it is possible for such a hardware failure to go unnoticed.

BRIEF SUMMARY OF THE INVENTION

In view of such shortcomings of the prior art, a primary object of the present invention is to provide such a method for computing a value of speed from a pulse signal which is not disrupted by contamination of the pulse signal with noise.

A second object of the present invention is to provide such a method which would not permit any permanent error in the data go unnoticed.

These and other objects of the present invention can be accomplished by providing a method for computing a vehicle speed value from a detected vehicle speed value derived from a pulse signal, said method providing data which can be used in a control process, comprising the steps of: predicting the current vehicle speed value from a previously computed vehicle speed value when an abnormal state of the current detected vehicle speed value is detected; and producing a cancel signal for aborting the control process when the abnormal state was detected and has persisted for more than a certain time period. The abnormal state of the current detected vehicle speed value is detected as a change of the current detected vehicle speed value by more than a predetermined magnitude over a preceding computed vehicle speed value or, alternatively, a preceding detected vehicle speed value.

Thus, since the derivation of an abnormal computed vehicle speed value is prevented when a temporary abnormal condition of the detected vehicle speed value has occurred, and a cancel signal which may be used for aborting the operation of a control system, whose action is based on the computed vehicle speed value, is produced when the abnormal condition of the detected vehicle speed has persisted for more than a certain time period, the control system can respond to the abnormal conditions of the detected vehicle speed value in optimal fashion, and the above mentioned problems are eliminated.

According to a preferred embodiment of the present invention, the control process consists of a cruise control for controlling the speed of a vehicle at a fixed level. Optionally, the cancel signal may be accompanied by the issuance of a warning to the operator of the vehicle for added convenience.

DETAILED DESCRIPTION OF THE PREFERRED EMBODIMENTS

Figure 1:
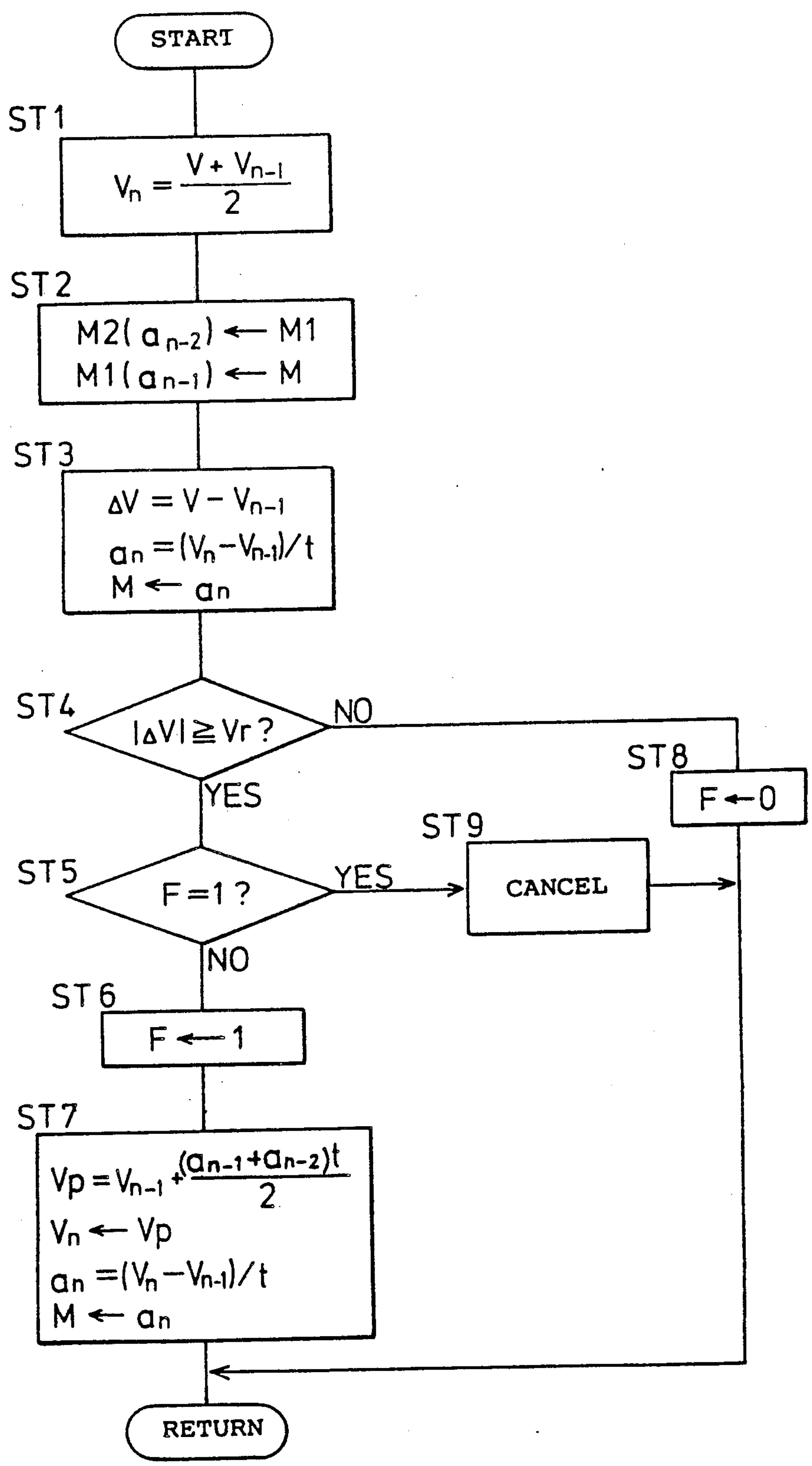
FIG. 1 is a flow chart for showing the flow of the method for computing a value of speed from a pulse signal according to the present invention.

FIG. 1 shows the flow of an embodiment of the method for computing a value of speed according to the present invention. In this algorithm, the value of the current speed (current computed speed value) $V_n$ is computed in ST1 according to the following equation.

$$V_n=(V+V_{n-1})/2 \quad (1)$$

where V is the current value of the detected vehicle speed and $V_{n-1}$ is the computed value of the vehicle speed of the preceding cycle of computation.

Then, in ST2, the acceleration value $a_{n-1}$ stored in memory M1 in the preceding cycle of computation is shifted to memory M2 as the yet preceding acceleration value $a_{n-2}$, and the current acceleration value $a_n$ stored in memory M is shifted to the memory M1 as the new preceding acceleration value $a_{n-1}$. In ST3, the current acceleration value $a_n$ is computed from the difference ΔV between the current computed vehicle speed and the preceding computed vehicle speed according to the following equation and is stored in memory M.

$$a_n=(V_n+V_{n-1})/t \quad (2)$$

where t is a period of each computation cycle.

In ST4, if the absolute value of the speed difference $\Delta V$ is equal to or greater than a certain reference value $V_r$ (for instance 4 km/h), the current detected value of speed is determined to be abnormal and the program flow advances to ST5. If a flag F is not "1" in ST5, the program flow advances to ST6 where "1" is set in the flag F. (The flag F is set to "0" when the program is initialized.) In ST7, a predicted value of speed $V_p$ is computed according to the following equation.

$$V_p = V_{n-1} + (a_{n-1} + a_{n-2})t/2 \quad (3)$$

And, this predicted value of speed $V_p$ is accepted as the computed value of the current vehicle speed. At the same time, the current acceleration $a_n$ is computed according to this computed (predicted) value of the vehicle speed from the equations similar to those of ST3, and is stored in the memory M anew.

If the absolute value of the speed difference $\Delta V$ is determined to be less than the reference value $V_r$ in ST4, the program flow advances to ST8 where the flag F is restored to zero, and then moves on to a new cycle of computation.

In the next cycle of computation, if the absolute value of the speed difference $\Delta V$ is equal to or greater than than the reference value $V_r$ in ST4, the program flow advances to ST5 again but, if the flag carries "1", the program flow advances to ST9 where the control is canceled or aborted.

Thus, if the absolute value of the speed difference $\Delta V$ continues to be equal to or greater than the reference value $V_r$ for more than a predetermined period of time or for more than a predetermined number of computation cycles (twice in the case of the present embodiment), it is determined not as a temporary error due to noise but a permanent error which, for instance, may be due to a hardware failure and, therefore, the control process is aborted. The predetermined period of time or the predetermined number of computations which is given here as a criterion for determining whether the error is permanent or temporary may be selected as required, and it can be easily implemented by modifying the program flow given in FIG. 1.

Figure 2:
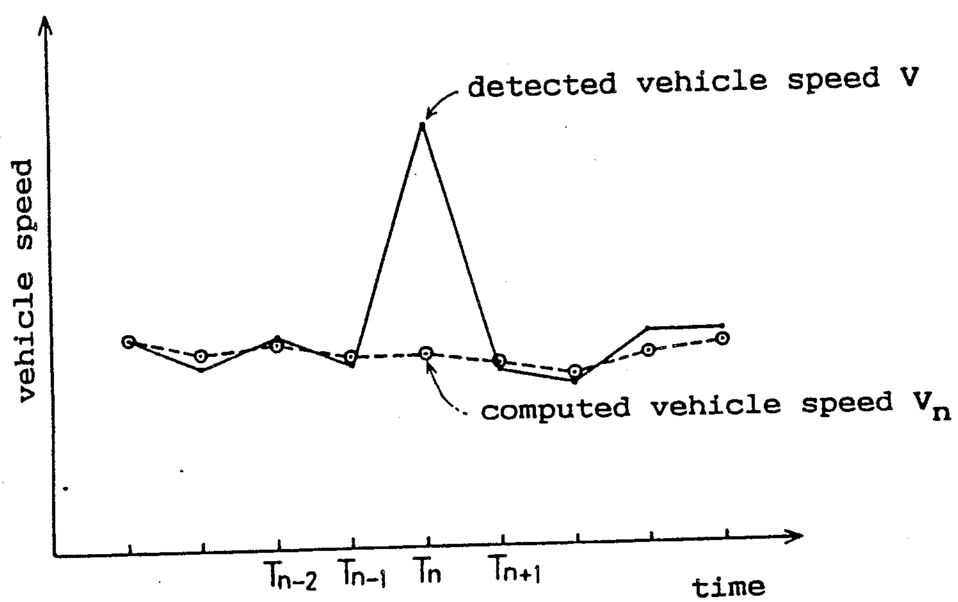
FIG. 2 is a graph showing the changes in the detected speed value and the computed speed value in case of a temporary abnormal state of the pulse signal.

FIG. 2 shows the time histories of the detected value V and the computed value $V_n$ of the vehicle speed, in solid line and broken line, respectively. At a time point $T_{n-1}$, the detected data is normal and the speed difference $\Delta V$ ($=V-V_{n-1}$) is less than the reference value $V_r$. But, after one sampling time period t, or at the time point $T_n$, the detected vehicle speed value V makes a sudden change, and the speed difference $\Delta V$ becomes equal to or greater than the reference value $V_r$. In this case, as mentioned earlier, the predicted value $V_p$ of the vehicle speed derived in ST4 through ST7 is used as the computed vehicle speed $V_n$, and the computed vehicle speed value $V_n$ is prevented from undergoing a sudden change at the time point $T_n$.

At the next time point $T_{n+1}$, if the detected vehicle speed value V returns to the normal level of the time point $T_{n-1}$, the program flow advances from ST4 to ST8 and the computed vehicle value $V_n$ maintains its normal level without being affected by the sudden change in the detected vehicle speed value $V_n$ at the time point $T_n$.

Figure 3:
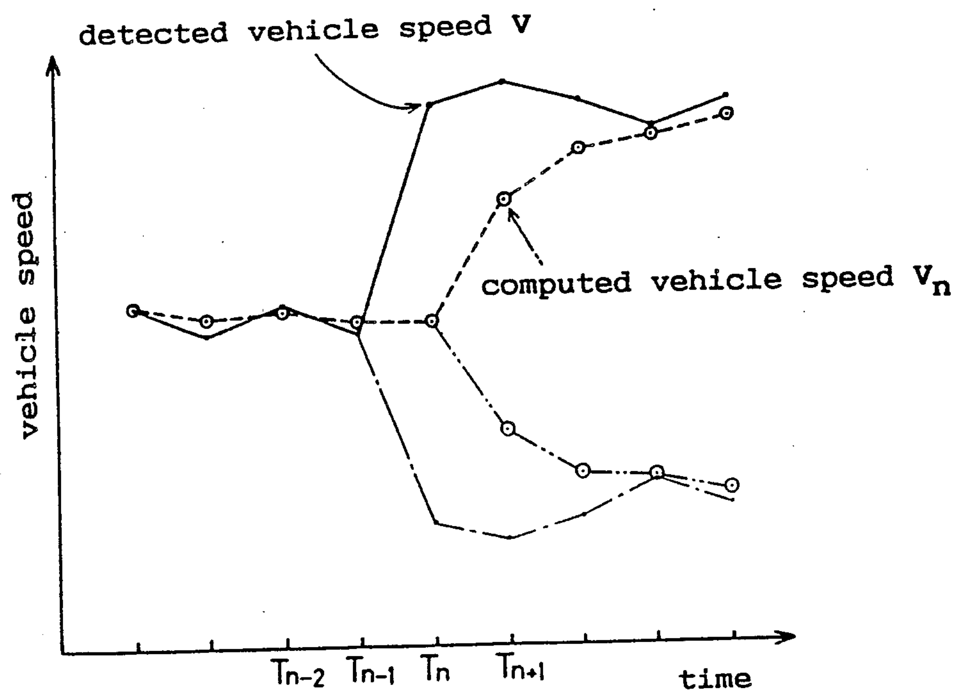
FIG. 3 is a graph similar to FIG. 2 in case of a permanent abnormal state of the pulse signal.

FIG. 3 is a graph similar to that of FIG. 2 but, in this case, the detected vehicle speed value not only makes a sudden change at the time point $T_n$ but also maintains this abnormal level thereafter. The computed vehicle speed value $V_n$ does not make a sudden change at the time point $T_n$ as discussed earlier, but, since the detected vehicle speed value V remains substantially unchanged from the preceding value at the time point $T_{n+1}$, the program flow advances from ST4 to ST5. Since the flag F carries "1", the program flow advances from ST5 to ST9 where the control process is aborted. However, the computation of the vehicle speed may be continued and, in this case, the computed vehicle speed $V_n$ maintains its level as shown in the graph of FIG. 3.

When the detected vehicle speed value V has made a sharp drop, instead of a sharp rise, the same computation process is executed, and the computed vehicle speed value $V_n$ maintains its level as indicated by the double-chain-dot line in the graph of FIG. 3. In this case also, the control process is aborted.

It is possible to display the computed vehicle speed value at the time point $T_{n+1}$ as an abnormal speed and/or sound an alarm when the abnormal condition of the detected vehicle value has persisted for more than a predetermined period of time. Alternatively or additionally, the cruise control system may be forced into a state for reducing the vehicle speed as an added safety measure.

Thus, according to the present invention, since the derivation of an abnormal computed vehicle speed value is prevented when a temporary abnormal condition of the detected vehicle speed value has occurred, and a cancel signal which may be used for aborting the operation of a control system, whose action is based on the computed vehicle speed value, is produced when the abnormal condition of the detected vehicle speed has persisted for more than a certain time period, the control system can respond to the abnormal conditions of the detected vehicle speed value in optimal fashion, and convenience and safety are both maximized.

What we claim is:

1. A method for obtaining a current vehicle speed value from a detected vehicle speed value, said current vehicle speed value being for use in a vehicle speed control process, and ensuring accurate operation of said vehicle speed control process, said method comprising the steps of:

computing a predicted current vehicle speed value from a previously computed vehicle speed value;

substituting the resulting predicted value for a current vehicle speed value computed from a current detected vehicle speed value if said current detected vehicle speed value falls outside a predetermined range of values; and producing a cancel signal for aborting said vehicle speed control process when said current detected vehicle speed value continues to fall outside said predetermined range of values for more than a certain time period.

2. A method as defined in claim 1, wherein said current detected vehicle speed value is detected as falling outside said predetermined range of values by determining whether a change of said current detected vehicle speed value by more than a predetermined magnitude over a preceding computed vehicle speed value exists.

3. A method as defined in claim 1, wherein said current detected vehicle speed value is detected as falling outside said predetermined range of values by determining whether a change of said current detected vehicle speed value by more than a predetermined magnitude over a preceding detected vehicle speed value exists.

4. A method as defined in claim 1, wherein said vehicle speed control process consists of a cruise control for controlling the speed of a vehicle at a fixed level.

5. A method as defined in claim 4, wherein said cancel signal is accompanied by the issuance of a warning to the operator of said vehicle.

6. A method for obtaining a current vehicle speed value for use in a process for controlling a cruise control mechanism to maintain a vehicle's speed at a preset value, said method comprising the steps of:

detecting a current vehicle speed and generating a detected current vehicle speed value;

deriving a computed current vehicle speed value from said detected current vehicle speed value;

deriving an acceleration value of said vehicle from said computed current vehicle speed value and a computed vehicle speed value from a preceding cycle of computation;

detecting whether a change in said detected current vehicle speed value from a preceding cycle of computation falls outside a predetermined range of values;

predicting a current vehicle speed value from previously derived acceleration values and from said computed vehicle speed value from said preceding cycle of computation;

substituting the resulting predicted current vehicle speed value for said computed current vehicle speed value as a result of a detection that said change in said detected current vehicle speed value falls outside said predetermined range of values; and producing a cancel signal for aborting said process for controlling upon detection that a change in said detected current vehicle speed falls outside said predetermined range of values for a predetermined number of succeeding cycles of computation.

7. A method as defined in claim 6 wherein, in the step of deriving a computed current vehicle speed value, the computed current vehicle speed value is computed from said detected current vehicle speed value as well as a computed vehicle speed value from said preceding cycle of computation.

8. A method as defined in claim 7 wherein, in the step of detecting whether said change falls outside said predetermined range of values, said change is detected by comparing a magnitude of the difference between said detected current vehicle speed value and said computed vehicle speed value from said preceding cycle of computation to a predetermined magnitude to determine whether said magnitude of the difference is above or below said predetermined magnitude.

* * * * *